G. ULLRICH.
MAGNETIC SEPARATOR.
APPLICATION FILED MAR. 14, 1913.

1,089,993.

Patented Mar. 10, 1914.

Witnesses
J. W. Wynkoop
H. B. Chinn

Inventor,
Georg Ullrich,
By
attorneys

UNITED STATES PATENT OFFICE.

GEORG ULLRICH, OF MAGDEBURG, GERMANY, ASSIGNOR TO FRIED. KRUPP, AKTIEN-GESELLSCHAFT, GRUSONWERK, OF MAGDEBURG-BUCKAU, GERMANY, A JOINT STOCK COMPANY.

MAGNETIC SEPARATOR.

1,089,993.   Specification of Letters Patent.   Patented Mar. 10, 1914.

Application filed March 14, 1913. Serial No. 754,338.

*To all whom it may concern:*

Be it known that I, GEORG ULLRICH, a subject of the King of Bavaria, and resident of Magdeburg, German Empire, have invented certain new and useful Improvements in Magnetic Separators, of which the following is a specification.

This invention relates to magnetic separators and has reference to separators in which one or more magnet poles are arranged about a vertical shaft beneath a counter pole consisting of one or more downwardly tapered rings co-axially disposed. In separators of this kind relative angular movement takes place between the upper and lower poles and the material to be treated is made to pass across the magnetic field or fields between the upper and the lower poles with the result that the magnetic or magnetizable particles become attracted and are afterward removed forcibly from the surface to which they are adhering or are free to fall away therefrom owing to change in position of the magnetic field relatively to the adhering particles.

According to the present invention the magnet poles are made to rotate and the upper ring-shaped counter pole is stationary, and the material to be treated is conveyed through one or more channels which rotate with the lower pole or poles. In the further description of the invention it will be assumed that there are several lower poles. When the material to be treated passes through the channels and across the magnetic fields, the magnetic or magnetizable particles are attracted by the upper stationary pole and are left adhering thereto as the lower poles rotate. As soon as these particles are no longer within the magnetic field between the upper and lower poles they drop away from the upper pole, or can be forcibly removed therefrom by liquid spraying devices or other convenient means arranged to rotate with the lower poles.

Figure 1:
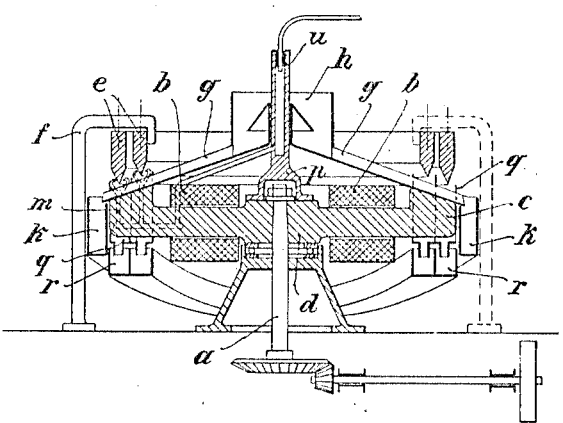
Figure 2:
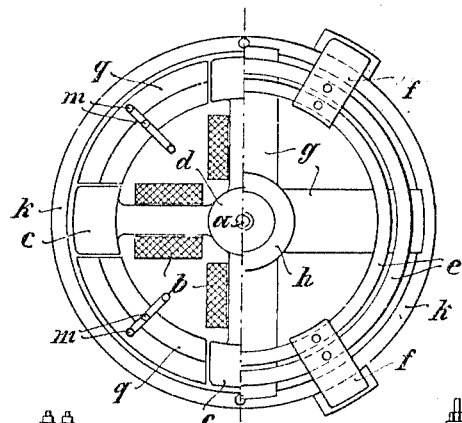
Figure 3:
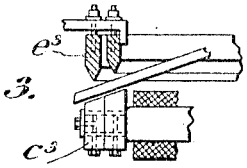

In order that the invention may be clearly understood and readily carried into effect, the same will now be described more fully with reference to the accompanying drawing which illustrates one embodiment of the invention, Figure 1 being an axial sectional elevation and Fig. 2 a plan. Fig. 3 illustrates a device for adjusting laminated upper and lower poles, and Fig. 4 a similar arrangement for solid upper and lower poles.

$c\ c$ are the lower magnet poles, and $e\ e$ are two co-axial upper ring-shaped poles. The lower poles $c\ c$ are rigidly connected by means of a hub $d$ to a vertical shaft $a$, which is driven in any convenient manner. These magnet poles are energized by current passed through windings $b$. The upper poles $e$—$e$ are constructed of magnetizable material and are tapered downwardly in known manner; they are carried by uprights $f$ and are vertically adjustable to enable the width of the magnetic fields extending between their tapered edges and the surface of the lower magnet poles to be regulated.

$g\ g$ are the channels for conveying the material to be treated; these channels rotate with the lower magnet poles and are so arranged that there is a channel crossing each of the magnetic fields.

$h$ is an inlet common to all the conveyer channels and $k$ is a stationary channel into which the non-magnetic or non-magnetizable portion of the material passes.

Between each pair of conveyer channels, and therefore between every two adjacent magnet poles $c\ c$, are arranged spraying devices $m$ directed upward against the ring-shaped stationary poles $e\ e$. The spraying devices $m$ rotate with the lower magnet poles and their respective channels and are supplied with liquid through branch pipes leading from a common pipe $u$ which is mounted axially upon the hub $d$ by a pedestal $p$. The spraying liquid together with the particles removed by it from the poles $e\ e$ fall into suitably placed channels $q$, which rotate with the magnet poles $c\ c$ and their channels $g\ g$ and correspond in number and position with the stationary poles $e\ e$. The rotary channels $q$ discharge into stationary channels $r$.

The operation of the magnetic separator above described will be readily understood and may be stated briefly as follows:—The material to be treated is fed into the inlet $h$ and passes down the channels $g\ g$ until it crosses the magnetic fields extending between the upper and lower poles, whereupon the magnetic or magnetizable particles are attracted by and adhere to the poles $e\ e$, while the remainder of the material passes into the channel $k$. The magnetic fields travel around with the lower magnet poles, and since at points between the lower poles the portions of the upper poles will exercise little if any attraction, practically all of the adhering particles falls away from the poles as soon as the lower poles have passed beyond such particles. Any particles remaining upon the upper poles are washed off by the liquid sprayed from the devices $m$ which latter rotate with and therefore always follow the magnet poles $c\ c$. The particles and the spraying liquid fall into the channels $q$ and pass thence into the channels $r$.

Figure 4:
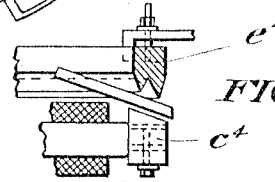

The strength of the magnet fields between the upper and lower poles may be regulated in several ways. According to one method the upper poles are vertically adjustable; if each of these poles is a solid mass it is adjustable as a whole, but if it is composed in a known manner of several annular rings the latter may be adjusted individually. Alternatively, the upper poles may be rigidly fixed in position with downwardly directed tapered edges, and the lower magnet poles be vertically adjustable, and their adjustment may be effected collectively, individually, or in sections if they are composed of laminations in a known manner. Obviously an alternative method to either of those above referred to is the adoption of both methods. This adjustment may be accomplished in the manner illustrated in Fig. 3, where the laminated upper and lower poles $e^3$ and $c^3$ may be adjusted either individually or collectively. When the poles are solid the adjustment may take place as illustrated in Fig. 4, when the upper pole $e^4$ alone or the lower pole $c^4$ alone or both together may be adjusted.

Having now particularly described and ascertained the nature of my said invention and in what manner the same is to be performed, I declare that what I claim is:—

1. A magnetic separator comprising a revoluble magnet pole of less extent than a full circle, a stationary ring-shaped counter-pole situated above said revoluble pole, and a channel corresponding in position to the revoluble magnet pole and adapted to rotate therewith, so that the material to be treated is conveyed across the magnetic field extending between the lower and upper poles, whereby the magnetic or magnetizable particles are attracted by and adhere to the upper pole while magnetic, and afterward fall away from the upper pole when unmagnetic.

2. A magnetic separator comprising a plurality of magnet poles spaced circumferentially apart rotatable about a common shaft, a plurality of downwardly tapered stationary rings situated above, and concentrically with respect to, the aforesaid poles and constituting a counterpole thereto, a plurality of channels rotatable with the magnet poles and extending across the magnetic fields between the magnet poles and the counter-pole, an inlet common to all the rotatable channels, a circular stationary channel into which the rotatable channels discharge, spraying devices adapted to discharge liquid against the tapered edges of the counter-pole, said spraying devices being situated between the magnet poles and rotatable therewith, and stationary channels vertically below the counter pole adapted to receive the falling particles and spraying liquid, substantially as described.

The foregoing specification signed at Magdeburg.

GEORG ULLRICH.

In presence of—
HERMANN STEPHANI,
OSKAR MARKISCH.